United States Patent
Shim

(10) Patent No.: US 7,433,285 B2
(45) Date of Patent: Oct. 7, 2008

(54) DISK HAVING UNIQUE CODE FOR IDENTIFYING ITS TYPE FOR OPTICAL DISK PLAYER AND METHOD FOR DISCRIMINATING TYPES THEREOF

(75) Inventor: Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/742,179

(22) Filed: Apr. 30, 2007

(65) Prior Publication Data

US 2007/0201333 A1    Aug. 30, 2007

Related U.S. Application Data

(60) Division of application No. 11/399,504, filed on Apr. 7, 2006, now Pat. No. 7,245,566, which is a continuation of application No. 10/849,203, filed on May 20, 2004, now Pat. No. 7,230,894, which is a continuation of application No. 10/448,037, filed on May 30, 2003, now Pat. No. 7,061,843, which is a division of application No. 09/223,762, filed on Dec. 31, 1998, now Pat. No. 6,608,804.

(30) Foreign Application Priority Data

Dec. 31, 1997    (KR) ............................. 1997-080595

(51) Int. Cl.
    *G11B 7/00*    (2006.01)
(52) U.S. Cl. ................ 369/53.22; 369/275.3; 369/47.27
(58) Field of Classification Search ................ 369/47.1, 369/47.27, 275.3, 53.2, 53.22, 53.1
See application file for complete search history.

(56) References Cited

U.S. PATENT DOCUMENTS 4,677,604 A    6/1987    Selby, III et al.

(Continued)

FOREIGN PATENT DOCUMENTS

EP    0 853 315    7/1998

(Continued)

OTHER PUBLICATIONS

U.S. Appl. No. 11/399,504, filed Apr. 7, 2006, Jae-Seong Shim, Samsung Electronics Co., Ltd.

(Continued)

*Primary Examiner*—Nabil Z Hindi
(74) *Attorney, Agent, or Firm*—Stein, McEwen & Bui, LLP

(57) ABSTRACT

A BCA (Burst Cutting Area) code including a unique disk code indicating the type of a disk is written in a BCA code area of the disk. If the disk is mounted into the optical disk player, the optical disk player reads data written in the BCA code area, extracts the disk code contained in the read data, and confirms the type of the disk corresponding to the extracted disk code by retrieving a disk code table in which disk codes corresponding to the types of disks are mapped.

7 Claims, 4 Drawing Sheets

U.S. PATENT DOCUMENTS

| | | |
|---|---|---|
| 5,878,020 A | 3/1999 | Takahashi |
| 5,959,280 A | 9/1999 | Kamatani |
| 6,034,934 A | 3/2000 | Miyake et al. |
| 6,034,937 A | 3/2000 | Kumagai |
| 6,081,785 A | 6/2000 | Oshima et al. |
| 6,295,262 B1 | 9/2001 | Kusumoto et al. |
| 6,608,804 B2 | 8/2003 | Shim |
| 7,061,843 B2 | 6/2006 | Shim |

FOREIGN PATENT DOCUMENTS

| | | |
|---|---|---|
| JP | 9-7288 | 1/1997 |
| JP | 10-198558 | 7/1998 |
| JP | 10-228713 | 8/1998 |

OTHER PUBLICATIONS

U.S. Appl. No. 10/849,203, filed May 20, 2004, Jae-Seong Shim, Samsung Electronics Co., Ltd.

National Technical Report, vol. 43, No. 3, Mitsuaki Oshima et al., Panasonic Dream, DVD ROM BCA (Burst Cutting Area), Recording Method to Add Unique Information on ROM Disc of DVD BCA, Jun. 1997.

National Technical Report, vol. 43, No. 4, DVD Rom, Additional Information Recording Method on DVD-ROM Disk, Sinichi Tanaka et al., Optical Disk Systems Development Center, Oct. 1997.

U.S. Appl. No. 11/742,631, filed May 1, 2007, Jae-Seong Shim, Samsung Electronics Co., Ltd.

U.S. Appl. No. 11/399,504, filed Apr. 7, 2006, Jae-Seong Shim, Samsung Electronics Co., Ltd.

U.S. Appl. No. 10/849,203, filed May 20, 2004, Jae-Seong Shim, Samsung Electronics Co., Ltd.

US 7,433,285 B2

DISK HAVING UNIQUE CODE FOR IDENTIFYING ITS TYPE FOR OPTICAL DISK PLAYER AND METHOD FOR DISCRIMINATING TYPES THEREOF

CROSS-REFERENCE TO RELATED APPLICATIONS

This application is a Divisional application of application Ser. No. 11/399,504 filed Apr. 7, 2006, now U.S. Pat. No. 7,245,566 currently, which is a continuation of application Ser. No. 10/849,203 filed May 20, 2004, now U.S. Pat. No. 7,230,894currently, which is a continuation of application Ser. No. 10/448,037, filed May 30, 2003, now U.S. Pat. No. 7,061,843, which is a divisional of application Ser. No. 09/223,762, filed Dec. 31, 1998, now U.S. Pat. No. 6,608,804, the disclosures of which are incorporated by reference herein. This application also claims the benefit of Korean Application No. 1997-80595, filed Dec. 31, 1997, in the Korean Intellectual Property Office, the disclosure of which is also incorporated by reference herein.

BACKGROUND OF THE INVENTION

1. Field of the Invention

The present invention relates to an optical disk player, and more particularly, to a method for discriminating the type of a disk mounted into an optical, disk player.

2. Description of the Related Art

An optical disk player reproduces data recorded on an optical disk, such as a CD (Compact Disk), CD-ROM (Compact Disk Read Only Memory), LD (Laser Disk), MD (Mini Disk), DVD (Digital Video Disk), etc. Since there are various types of optical disks, the optical disk player should discriminate the type of a disk mounted therein. Especially, a DVD player which uses a CD-series disk as well as a DVD-series disk may not accurately reproduce data unless it determines which type of disk is mounted therein.

Referring to FIG. 1, an optical pickup 102 optically picks up information recorded, on a disk and generates an electrically converted RF (radio frequency) signal. The optical pickup 102 has a focusing actuator and. a tracking actuator. The focusing actuator is driven by the control of a DSSP (Digital Servo Signal Processor) 114 and shifts an object lens toward an optical axis. The tracking actuator shifts the object lens toward the radial direction of a disk 100 to seek a track. A spindle motor 104 is driven under the control of the DSSP 114 to rotate a disk 100 at a CLV (Constant Linear Velocity). A sled feed motor 106 is driven under the control of the DSSP 114 to move the optical pickup 102.

An RF amplifier 108 amplifies the RF signal received from the optical pickup 102 and shapes a waveform of the amplified RF signal. The RF amplifier 108 supplies a modulation signal during writing to a DSP (Digital Signal Processor) 110 and supplies signals for tracking servo and focusing servo to the DSSP 114. If the disk 100 is a CD-series disk, the modulation signal is an EFM (Eight to Fourteen Modulation) signal. If the disk 100 is a DVD-series disk, the modulation signal is an EFM plus signal. The DSP 110 also restores a BCA (Burst Cutting Area) code reproduced from a BCA code area on the disk 100. An output processor 112 processes the data generated from the DSP 110 and generates a final output signal such as an audio signal. The DSSP 114, controlled by a microcomputer 116, controls tracking servo and focusing servo of the optical pickup 102, sled servo using the sled feed motor 106, and spindle servo, in response to signals received form the RF amplifier 108 and the DSP 110. The microcomputer 116, which is a main controller, controls the overall operation of an optical disk player.

FIG. 2 illustrates a general BCA code structure. The BCA code is comprised of a BCA preamble 200, BCA information data $I_{BCA}$ 202, an error detecting code $EDC_{BCA}$ 204$_9$ and error correcting code $ECC_{BCA}$ 206, and a BCA postamble 208. The BCA code is written in the disk together with a corresponding synchronizing byte. That is, the 4-byte BCA preamble 200 is written in the disk together with a BCA synchronizing byte $SB_{BCA}$. The BCA information data $I_{BCA}$ 202, the error detecting code $EDC_{BCA}$ 204, the error correcting code $ECC_{BCA}$ 206, and the BCA postamble 208 are written in the disk together with a BCA re-synchronizing byte $RS_{BCA}$.

The BCA information data $I_{BCA}$ 202 ($I_o$-$I_{16n-5}$) can be expressed by the following equation (1). The error detecting code $EDC_{BCA}$ 204 ($ED_o$-$ED_3$) is a parity for detecting an error of the BCA information data $I_{BCA}$ 202 and is expressed by the following equations (2) and (3) and as the remainder obtained by dividing input data $I_{BCA}(x)$ by a polynomial $G(x)$ which can be expressed by the following equation (4). A bit operation is expressed using a small letter 'x'.

$$I_{BCA}(x) = \sum_{i=32}^{128n-1} bi \cdot x^i \quad (1)$$

$$EDC_{BCA}(x) = \sum_{i=0}^{31} bi \cdot x^i \quad (2)$$

$$EDC_{BCA}(x) = I_{BCA}(x) \bmod G(x) \quad (3)$$

$$G(x) = x^{32} + x^{31} + x^4 + 1 \quad (4)$$

The error correcting code $ECC_{BCA}$ 206 ($C_{0,0}$-$C_{3,3}$) is a parity for correcting errors of the BCA information data $I_{BCA}$202 and the error detecting code $EDC_{BCA}$ 204 and is expressed as the remainder obtained by dividing input data $I_{BCAj}(x)$ by a polynomial $G_{pBCA}(X)$ as shown in the, following equations (5)-(9). A byte operation is expressed using a capital letter 'X'.

$$R_{BCAj}(X) = \sum_{i=0}^{3} C_{j,i} \cdot X^{3-i} \quad (5)$$

$$D_{BCAj}(X) = \sum_{i=0}^{4n-2} I_{j+4i} \cdot X^{51-i} + ED_j \cdot X^{52-4n} \quad (6)$$

$$ECC_{BCAj}(X) = I_{BCAj}(X) \bmod G_{pBCA}(X) \quad (7)$$

$$G_{pBCA}(X) = \prod_{k=0}^{3} (X + a^k) \quad (8)$$

$$Gp(x) = x^8 + x^4 + x^3 + x^2 + 1 \quad (9)$$

On the other hand, as shown in the BCA code structure of FIG. 2, there is a re-synchronizing byte $RS_{BCA1}$ area which is not used in the BCA code area. That is, the BCA code is written in the BCA code area provided, for example, near a lead-in area of the disk and there is an unused re-synchronizing byte area in the BCA code area. The lead-in area may be defined so as to include a separate area as the BCA code area. In the present invention, the BCA code including a disk code is written in the disk. Therefore, the BCA code includes the disk and the disk having the disk code in the BCA code area performs the normal operation in the optical disk player.

A conventional method for discriminating the type of a disk used in the DVD Player will now be described. If the user inserts the DVD-series or CD-series disk into the DVD player and a tray is closed, the DVD player sets its operating mode to a CD mode and starts focus searching. During the focus searching, the DVD player checks whether there is a focus error. If two focus error signals are respectively generated in the up and down movement directions of a lens, the DVD player judges the inserted disk to be a dual layer disk. If one focus error signal is generated, the inserted disk is regarded as a single layer disk. If focusing has ended, the DVD player rotates a spindle motor and checks a phase difference between E and F signals detected by an EIF photo diode of an optical pickup. If the phase difference is 180°, the inserted disk is judged to be the CD-series disk, and if there is no phase difference, it is regarded as the DVD-series disk. Thereafter, the DVD player checks a lead-in area of the disk to distinguish a V-CD (video CD), a CD-audio from the CD-series disk, and DVD-single, DVD-dual from the DVD-series disk. Thus, the disk discriminating operation is completed. This operation is controlled by a microcomputer which is a main controller of the DVD player.

Meanwhile, since the above-described disk discriminating operation is performed step by step, the microcomputer passes through many steps for detecting the type of disk. Therefore, the load on the microcomputer increases, and it takes a lot of time to discriminate the type of the disk. If the disk discriminating process has not ended in a short time period, a waiting time until a normal playback state is performed may be very long. Moreover, a check as to whether the disk is a dual layer or a single layer is made by using the focus error signal, and a determination as to whether the disk is the CD-series or the DVD-series is made from the phase difference between the E and F signals by utilizing the fact that a track pitch of the CD-series disk is different from that of the DVD-series disk. Therefore, if the disk has scratches, the disk player may wrongly detect the type of the disk. When considering future optical disks which will be put on the market, it becomes very difficult to discriminate the type of the disk and there will be a strong possibility that the type of the disk will be wrongly detected.

SUMMARY OF THE INVENTION

It is an object of the present invention to provide a disk having a unique code for identifying its type for an optical disk player and a method for rapidly and accurately discriminating the type thereof.

Additional objects and advantages of the invention will be set forth in part in the description which follows and, in part, will be obvious from the description, or may be learned by practice of the invention.

The foregoing and other objects of the present invention are achieved by providing a disk used in an optical disk player which includes a BCA (Burst Cutting Area) code area in which a BCA code is written. The BCA code area includes a preamble area in which a BCA preamble is written; an information data area in which BCA information data is written; an information data area in which BCA information data is written; an information parity area in which an error detection code for the BCA information data is written; a disk code area in which a unique disk code indicating the type of the disk is written; a code parity area in which an error detection code— for the disk code is written; an error correcting parity area in which an error correcting code for the BCA information data, for the error detecting code of the BCA information data, for the disk code and for the error detecting code of the disk code is written; and a postamble area in which a BCA postamble is written. The BCA code area is arranged in the order of the preamble area, information data area, information parity area, disk code area, disk code parity area, error correcting parity area, and postamble area.

The BCA code area is situated, for example, in the innermost area of the disk and represents an area in which the BCA code is written. Although the BCA code has not yet been defined as being used for a specific purpose, it may be used as a disk ID (Identification). A parity for error detection is typically called an error detecting code (EDC) and a parity for error correction is called an error correcting code (ECC).

The above and other objects of the present invention may also be achieved with a method for discriminating the type of a disk in an optical disk player which includes the steps of reading data written in a BCA code area upon mounting the disk into the optical disk player; extracting a disk code contained in the read data; confirming the type of the disk corresponding to the extracted disk code by retrieving a disk code table in which disk codes corresponding to the types of disks are mapped.

The disk code table is stored in a nonvolatile memory of the optical disk player by a manufacturer.

BRIEF DESCRIPTION OF THE DRAWINGS

The above and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
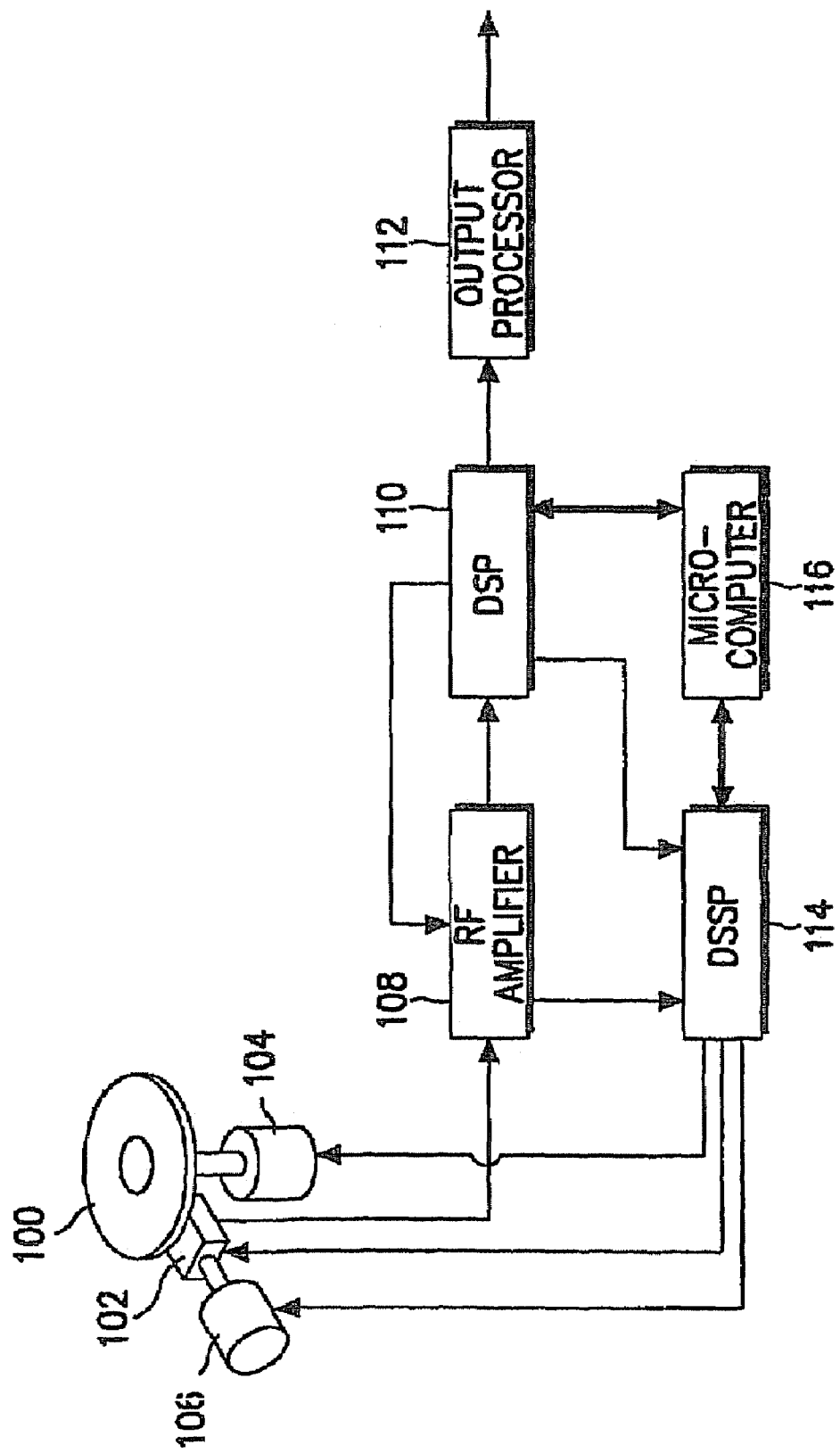
FIG. 1 is a block diagram of a conventional optical disk player.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In the following description, numerous specific details, such as a BCA code structure, a processing flow, equations, and the like, are set forth to provide a more thorough understanding of the present invention. It will be apparent, however, to one skilled in the art, that the present invention may be practiced without these specific details. In other instances, well known functions or constructions have not been described so as not to obscure the present invention.

Figure 2:
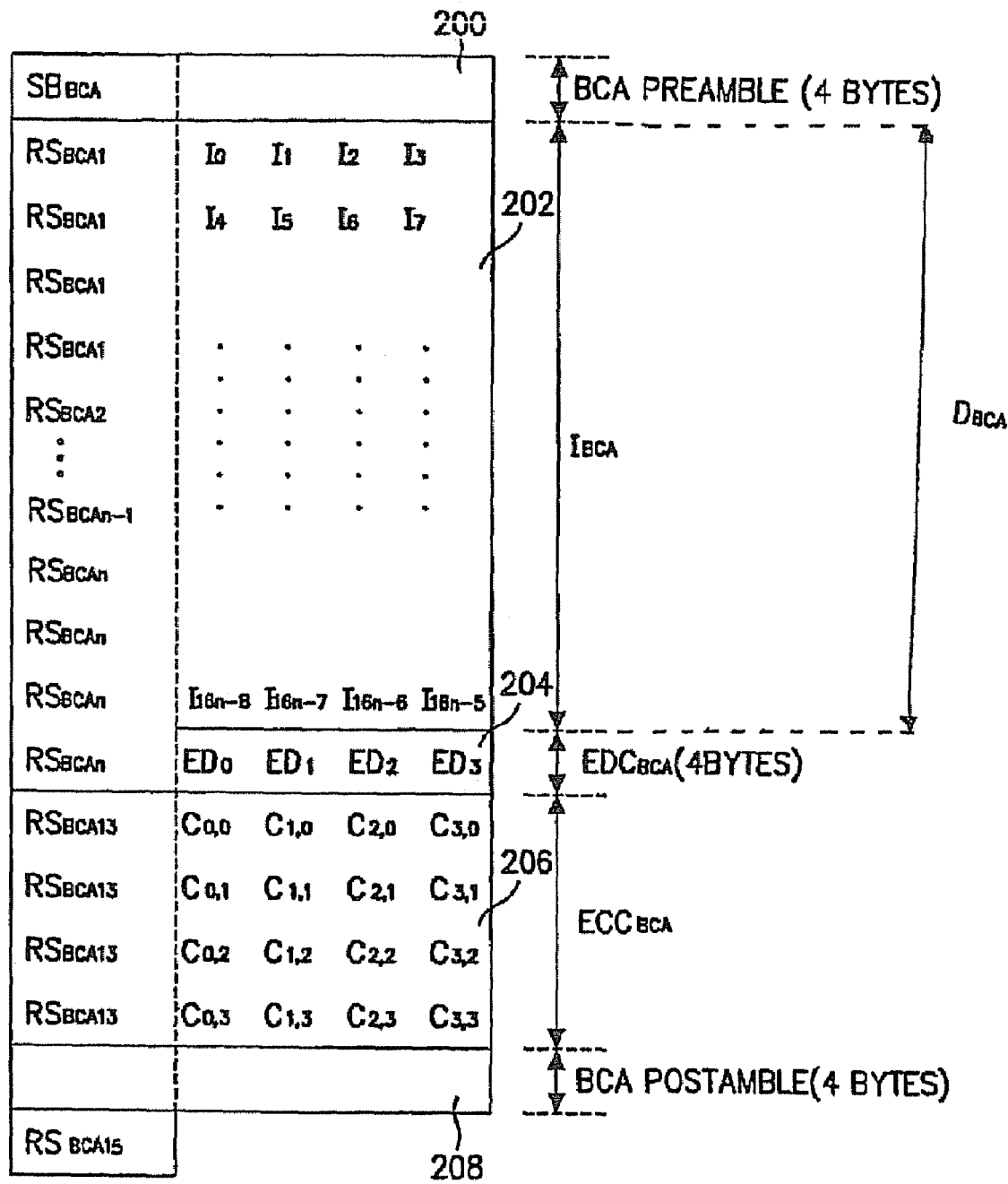
FIG. 2 shows a general BCA code structure.
Figure 3:
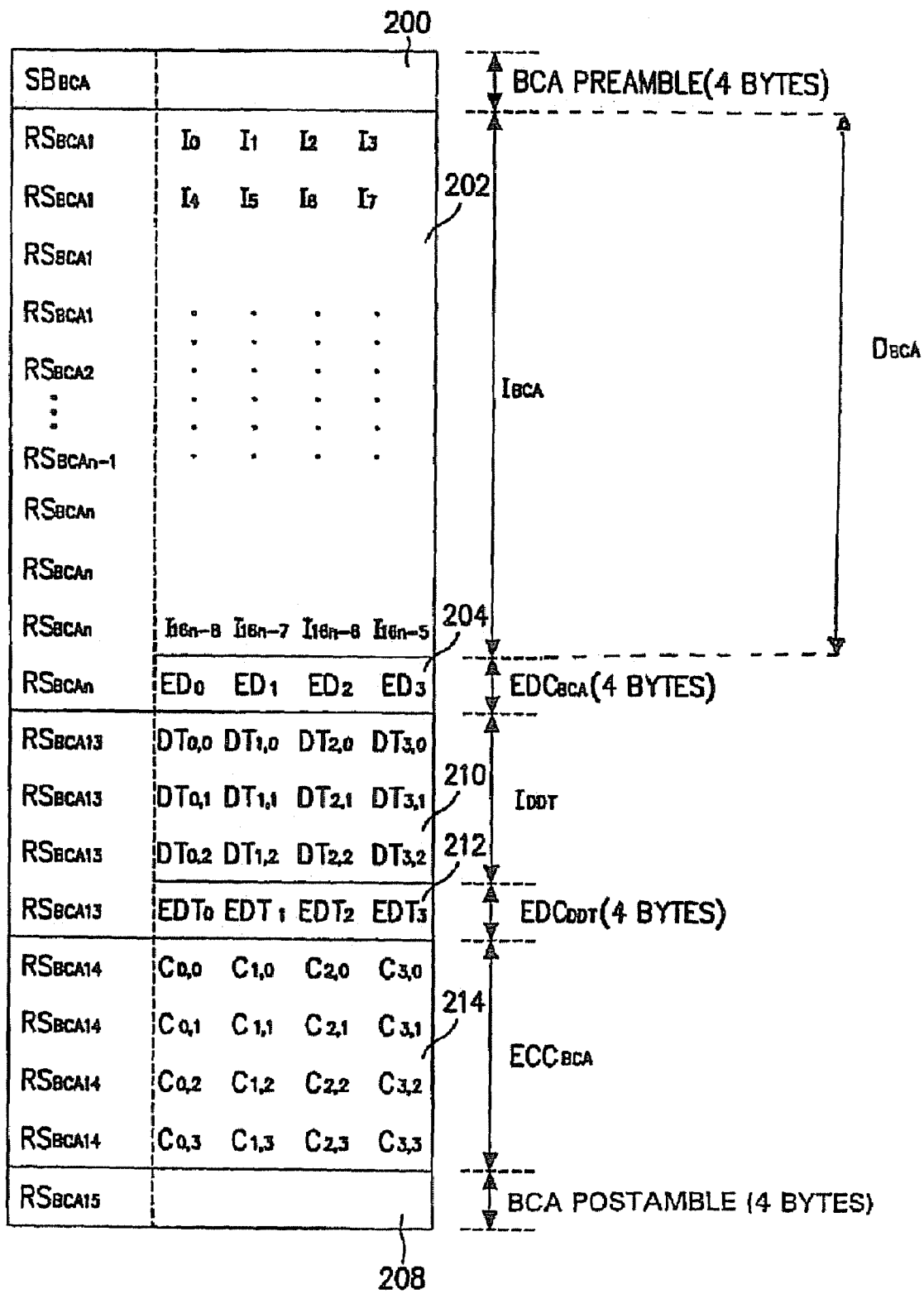
FIG. 3 shows a BCA code structure according to an embodiment of the present invention.

FIG. 3 illustrates a BCA code structure according to an embodiment of the present invention. The BCA code shown in FIG. 3 includes a BCA preamble 200, BCA information data $I_{BCA}$ 202, an error detecting code $EDC_{BCA}$ 204, a disk code IDDT 210, an error detecting code $EDC_{DDT}$ 212, an error correcting code $ECC_{BCA}$ 214, and a BCA postamble 208. In FIG. 3, the BCA code includes the disk code $I_{DDT}$ 210 and the error detecting code $EDC_{DDT}$ 212 in addition to the BCA code shown in FIG. 2, and the error correcting code $ECC_{BCA}$ is modified. The BCA code is written in the disk together with a corresponding synchronizing byte. That is, the 4-byte BCA preamble 200 is written in the disk together with a BCA synchronizing byte $SB_{BCA}$. The BCA information data $I_{BCA}$ 202, the error detecting code. $EDC_{BCA}$ 204, the disk code $I_{DDT}$ 210, the error detecting code $EDC_{DDT}$ 212, the error correcting code $ECC_{BCA}$ 214, and the BCA postamble 208 are written in the disk together with a BCA re-synchronizing byte $RS_{BCA}$. Therefore, the disk code $I_{DDT}$ 210 and the error detecting code $EDC_{DDT}$ 212 are inserted into the BCA code, and the error correcting code $ECC_{BCA}$ 214 and the BCA postamble 208 follow them. This is possible because the existing BCA code structure includes the unused re-synchronizing byte area.

The BCA information data $I_{BCA}$ 202 ($I_0$-$I_{16n-5}$) is expressed by the above equation (1). The error detecting code $EDC_{BCA}$ 204 ($ED_o$-$ED_3$) is a parity for detecting an error of the BCA information data $I_{BCA}$ 202 and is expressed by equation (2) as the remainder obtained by dividing the BCA information data $I_{BCA}$ 202 by the polynomial G(x) as indicated in the above equation (3).

The disk code $I_{DDT}$ 210 indicating the type of the disk is, expressed by the following equation (10). The 4-byte error detecting code $EDC_{DDT}$ 212 (see the following equation (11) is a parity for detecting an error of the disk code $I_{DDT}$ 210 and can be expressed as indicated in the following equation (12) as the remainder obtained by dividing the disk code $I_{DDT}(x)$ by a polynomial G(x) G(x) can be expressed by the following equation (13).

$$I_{DDT}(x) = \sum_{i=32}^{127} di \cdot x^i \quad (10)$$

$$EDC_{DDT}(x) = \sum_{i=0}^{31} di \cdot x^i \quad (11)$$

$$EDC_{DDT}(x) = I_{DDT}(x) \bmod G(x) \quad (12)$$

$$G(x) = x^{32} + x^{31} + x^4 + 1 \quad (13)$$

The error correcting code $ECC_{BCA}$ 214 ($C_{0,0}$-$C_{3,3}$) is a parity for correcting errors of the BCD information data $I_{BCA}$ 202, the error detecting code $EDC_{BCA}$, 204, the disk code $I_{DDT}$ 210 and the error detecting code $EDC_{DDT}$ 212 and can be expressed as the remainder obtained by dividing input data $I_{BCAj}(x)$ by a polynomial $G_{pBCA}(x)$ as indicated in the following equations (14) through (18).

$$ECC_{BCA}(X) = \sum_{i=0}^{3} C_{j,i} \cdot X^{3-i} \quad (14)$$

$$D_{BCA}(X) = \quad (15)$$

$$\sum_{l=0}^{4n-2} I_{j+4i} \cdot X^{55-i} + ED_j \cdot X^{56-4n} + \sum_{k=0}^{2} DT_{j,k} \cdot X^{7-k} + EDT_j \cdot X^4$$

$$ECC_{BCAj}(X) = D_{BCAj}(x) \bmod G_{pBCA}(X) \quad (16)$$

$$G_{pBCA}(X) = \prod_{m=0}^{3}(X + a'''') \quad (17)$$

$$Gp(x) = x^8 + x^4 + x^3 + x^2 + 1 \quad (18)$$

The BCA code having the above-mentioned structure is sequentially written in the BCA code area on the disk. Therefore, the BCA code area in which the BCA code including the disk code is written has a preamble area in which the BCA preamble is written; and information data area in which the BCA information data is written; and information parity area in which the error detection code for the BCA information data is written; a disk code area in which a unique disk code indicating the type of the disk is written; a disk code parity area in which the error detecting code for the disk code is written; an error correcting parity area in which the error correcting code for the BCA information data, for the error detecting code of the BCA information data, for the disk code and for the error detecting code of the disk code is written; and a postamble area in which the BCA postamble is written. The BCA code area is arranged in the order of the preamble area, the information data area, the information parity area, the disk code area, the disk code parity area, the error correcting parity area, and the postamble area.

Figure 4:
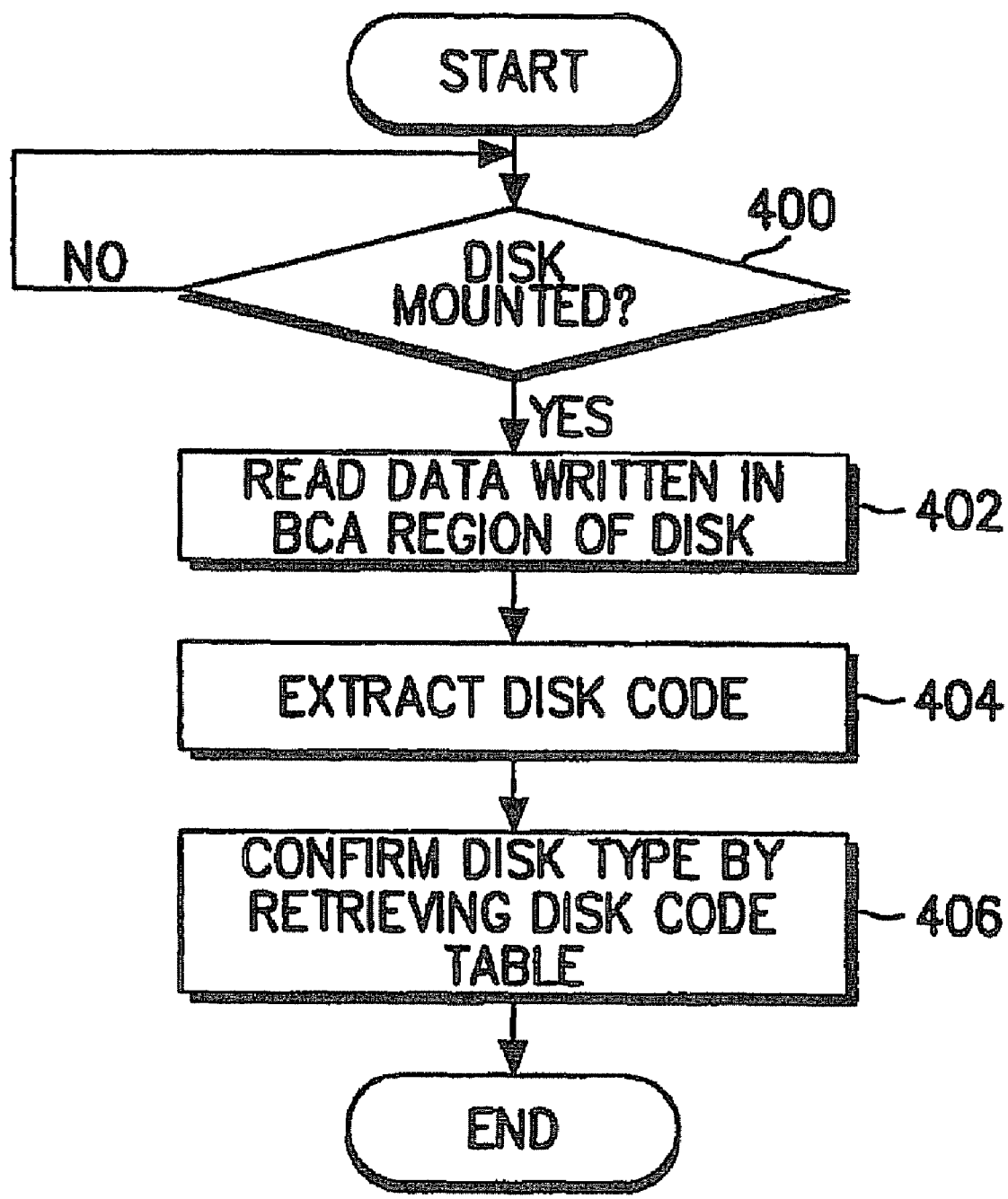
FIG. 4 is a flow chart showing a disk discriminating process according to the embodiment of the present invention.

FIG. 4 illustrates a disk discriminating process using the disk code when the disk in which the BCA code is written is mounted into the optical disk player. This process is performed by the microcomputer 116 shown in FIG. 1. If the disk 100 having the BCA code area in which the BCA code of FIG. 3 is written is mounted into the optical disk player of FIG. 1 at step 400, the microcomputer 116 reads data written in the BCA code area on the disk 100 at step 402. The read data is restored by the DSP 110. The microcomputer 116 extracts the disk code contained in the read data through the DSP 110 at step 404. The microcomputer 116 confirms the type of the disk corresponding to the extracted disk code by retrieving a disk code table at step 406. The disk code table is provided from a manufacturer by previously mapping the disk codes corresponding to the types of disks and stored in a nonvolatile memory of the microcomputer 116.

Consequently, a unique disk code corresponding to the type of a disk is previously written in the disk and the type of the disk is discriminated by using the disk code. Therefore, the type of the disk mounted into the optical disk player can be rapidly and accurately detected. Since the disk code and its error detecting code are inserted into the re synchronizing byte area which is not used in the existing BCA code structure, the added codes have no effect on the existing BCA code and the inventive disk can perform the normal operation.

As mentioned above, the type of the disk mounted into the optical disk player can be rapidly and accurately detected by using the disk code contained in the BCA code.

While the invention has been shown and described with reference to a certain preferred embodiment thereof, it will be understood by those skilled in the art that various changes in form and details may be made therein without departing from the spirit and scope of the invention as defined by the appended claims and that it may be possible, for example, to modify the number of bytes of the BCA code or the disk code and to differently apply the polynomial or the parity.

What is claimed is:

1. An optical disk player discriminating a type of an optical disk having a burst cutting area (BCA) in which a BCA code including sync bytes, a BCA preamble, BCA information data and parity for error correction of the BCA information data is written, the optical disk player comprising:
   an optical pickup to read the BCA code from the optical disk; and
   a processing unit to extract a disk code from the BCA information data of the BCA code, to discriminate the type of the optical disk according to the disk type information relative to information stored in the optical disk player and to perform error correction using the parity of the BCA code, wherein the disk code comprises disk type information comprising first information indicating a standard that the optical disk is included and second information indicating a number of recording layers that the optical disk has.

2. The optical disk player as claimed in claim 1, wherein the disk type information is stored in a disk code table in which the disk codes are corresponding to the types of optical disks are mapped.

3. The optical disk player as claimed in claim 1, wherein the BCA is in a separate area of a lead-in area of the optical disk.

4. The optical disk player as claimed in claim 1, wherein the BCA is included a lead-in area of the optical disk.

5. The optical disk as claimed in claim 1, wherein the BCA is situated in an inner area of the lead-in area of the optical disk.

6. The optical disk player as claimed in claim 1, wherein the BCA on the optical disk includes a preamble area in which a BCA preamble is written, an information data area in which BCA information data is written, an information parity area in which an error detection code (EDC) for the BCA information data is written, a disk code area in which the disk code indicating the type of the optical disk is written, an error correcting parity area in which parity for error correction the BCA information data is written, and a postamble area in which a BCA postamble is written.

7. The optical disk player as claimed in claim 1, wherein the processing unit is arranged to extract the disk code included in the BCA code, and to determine the type of the optical disk mounted on the optical disk player by comparing the disk code extracted from the BCA code with the information stored in the optical disk player having a plurality of disk codes corresponding to a plurality of different types of optical disks.

\* \* \* \* \*

UNITED STATES PATENT AND TRADEMARK OFFICE
CERTIFICATE OF CORRECTION

| | |
|---|---|
| PATENT NO. | : 7,433,285 B2 |
| APPLICATION NO. | : 11/742179 |
| DATED | : October 7, 2008 |
| INVENTOR(S) | : Jae-Seong Shim |

It is certified that error appears in the above-identified patent and that said Letters Patent is hereby corrected as shown below:

Column 6, line 62, insert --is-- after "data".

Column 8, line 8, insert --of-- after "correction".

Signed and Sealed this

Sixteenth Day of December, 2008

JON W. DUDAS
*Director of the United States Patent and Trademark Office*